United States Patent [19]

Hüsler

[11] 3,788,021
[45] Jan. 29, 1974

[54] INTERCONNECTION SYSTEM FOR STRUCTURAL ELEMENTS
[75] Inventor: Balthasar Hüsler, Olten, Switzerland
[73] Assignee: Alphons Glutz-Blolzheim A.G., Solothurn, Switzerland
[22] Filed: Dec. 22, 1971
[21] Appl. No.: 210,933

[30] Foreign Application Priority Data
Jan. 8, 1971 Switzerland............................ 251/71

[52] U.S. Cl.................. 52/403, 52/346, 52/379, 52/481, 52/508
[51] Int. Cl............................................. E04b 2/32
[58] Field of Search..... 52/403, 346, 481, 345, 490, 52/508, 378, 379, 238, 321, 488

[56] References Cited
UNITED STATES PATENTS

| R19,431 | 1/1935 | Balduf.................... 52/346 |
| 3,686,810 | 8/1972 | Allen...................... 52/488 X |
| 3,002,591 | 10/1961 | Hess....................... 52/508 X |
| 3,353,318 | 11/1967 | Bacher.................... 52/403 |
| 3,062,339 | 11/1962 | Geyser.................... 52/488 X |
| 1,195,289 | 8/1916 | Stevens................... 52/490 X |
| 2,205,725 | 6/1940 | Kavanagh................ 52/481 |
| 3,296,759 | 1/1967 | Paulecka................. 52/481 X |
| 3,184,013 | 5/1965 | Paulecka................. 52/481 X |
| 3,332,170 | 7/1967 | Bangs...................... 49/DIG. 1 |

FOREIGN PATENTS OR APPLICATIONS
229,343  9/1963  Austria................. 52/481

1,042,038  9/1966  Great Britain.................. 49/DIG. 1

Primary Examiner—Henry C. Sutherland
Assistant Examiner—Leslie A. Braun
Attorney, Agent, or Firm—Flynn & Frishauf

[57] ABSTRACT

To interconnect structural elements, such as walls, wall studs, door frames and the like and permit relative movement of the interconnected elements, for example due to differential expansion upon temperature or humidity changes, the elements to be interconnected are formed with matching projections and recesses which are shaped to be interlocked, and a liner, or layer of insulating material, such as plastic, fibrous material, felt or the like, preferably fire resistant, is located between the interlock projections and recesses; in one form, the projections are formed as longitudinal rails, secured for example by screws to one of the members, the recess being either formed in the other member, or being provided by an interlocking longitudinal rail, the two elements being slid against each other. The liner itself may be an elastomer which is stretched, so as to reduce its cross section during insertion, and, after having been located, reverts to its normal size and thickness, thus securely locking the elements together. The projecting elements may be divergent, in cross section V-shaped units which engage in converging sections, the divergent units being resiliently deformable to snap into the converging recess. To hold the parts securely together, a spacer can be located in the divergent section after assembly.

3 Claims, 8 Drawing Figures

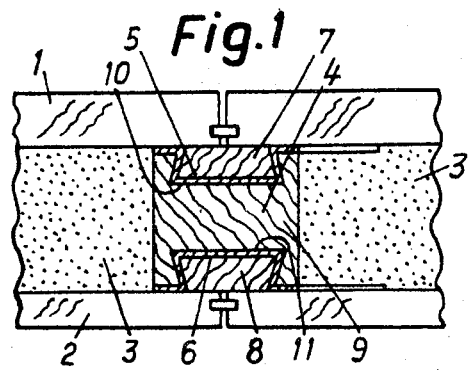
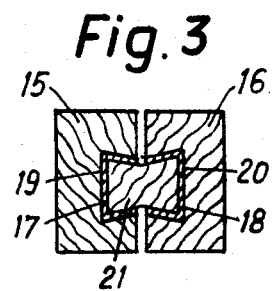
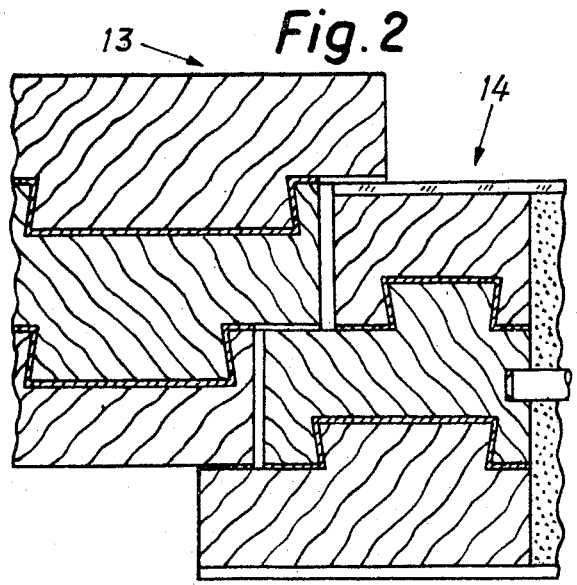
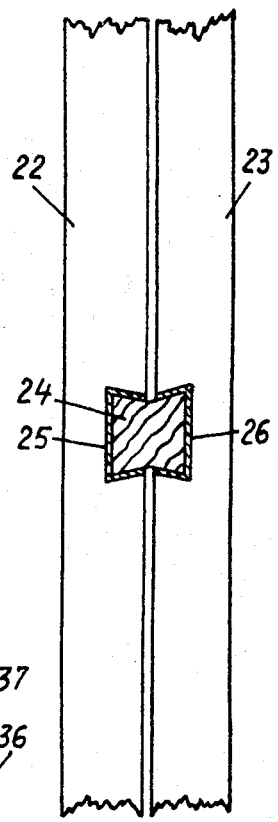
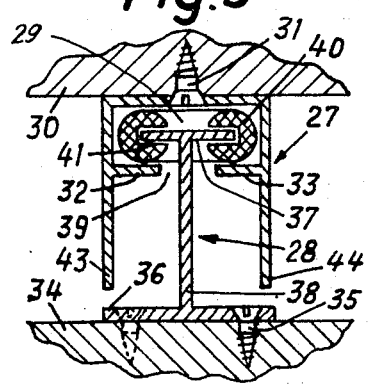
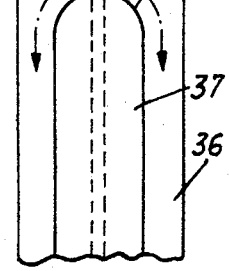

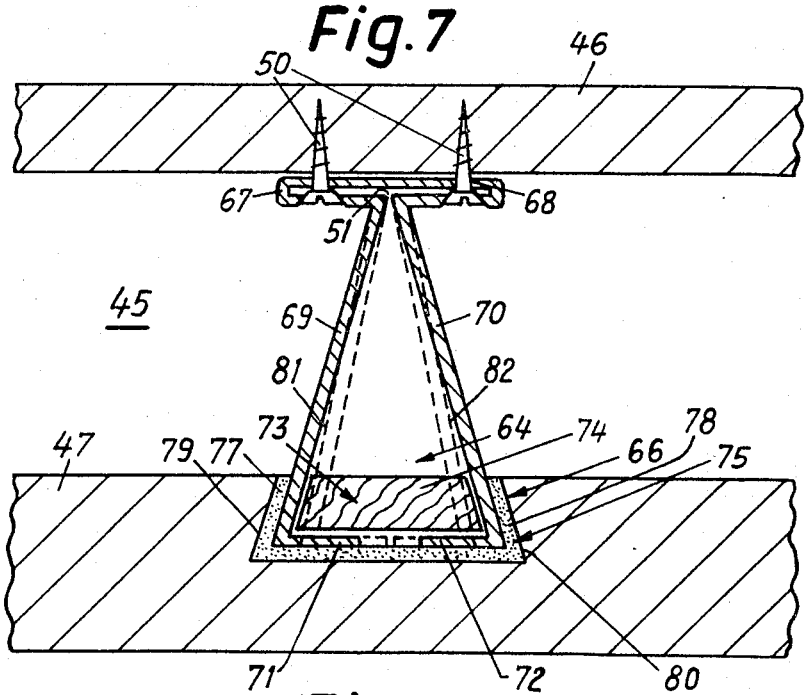
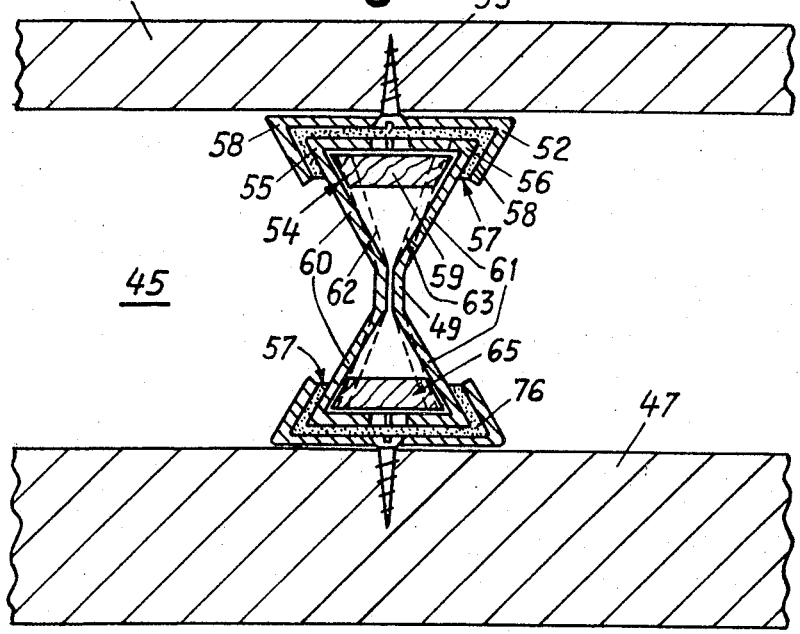

INTERCONNECTION SYSTEM FOR STRUCTURAL ELEMENTS

The present invention relates to an interconnection system for structural elements, and particularly for plates, door frames, studs, and the like in which the elements to be interconnected are subject to differential expansion, for example upon changes in temperature, humidity or the like, and in which the elements are insulated from each other.

It is known that wall units, particularly wall panel elements and the like when to be connected with other structural elements in a structure cause difficulty at the point of junction of the various elements. These difficulties are connected primarily with differential expansion of parts which are to be securely connected together. In the usual method of joining these elements together, for example by adhesion, nailing or the like, buckling may result. Differential expansion occurs, for example, if two portions of a door are subject to different climatic conditions, the outside of the door being subject to extreme cold and the inside to the heat of a building. Moisture penetrating wooden material is particularly troublesome in this respect. Other materials then would also experience these difficulties, primarily caused by temperature differences, and differential thermal coefficients of expansions. Substantial forces occur due to different expansion if the parts to be connected together have a different cross section. Thus, when a wall unit is to be manufactured, having good sound insulation, then the relationship of thickness to distance between the plates should be at least 1 : 2. Known systems and methods of interconnections do not permit connecting plates of even moderate size, and of different thickness, in parallel, with each other without running the risk of deformation upon differential expansion of the units to be interconnected.

Structural elements, such as wall panels, frequently have an insulating material therein, serving at the same time for heat insulation as well as for sound-proofing. The plates are secured at both sides in a frame, the insulation material being located between the studding, or support grid of the frame. It has been customary to secure the plates together so that they will be rigid, utilizing interconnecting elements such as screws, or nails, or using adhesives. Thus, the previously mentioned differential expansion will result in the application of substantial forces at the points of interconnection. Additionally, the sound insulation of panels of this kind is not good, since the studs to which the plates are securely attach from bridges for direct sound transmission from one plate to the other. An additional disadvantage of such interconnections is the comparatively low fire resistance. High temperatures destroy not only the wall elements, but also the interconnection elements, and particularly easily if the interconnection is formed by an adhesive. A wall having fire resistant insulation therein, then can collapse due to separation of the limiting wall panel, before the fire resistant element can even become effective.

It is an object of the present invention to provide an interconnection system for structural elements, for example for wall panels, which is reliable, permits differential expansion of the wall elements, and has improved heat and sound insulation characteristics and is largely fire resistant.

SUBJECT MATTER OF THE PRESENT INVENTION

Briefly, the structural elements are interconnected by matching projection and recess units, such as rails or the like, which are so shaped and profiled that they will interlock with each other. A suitable shape is, for example, a dove-tail interconnection. A layer of insulating material, such as fibrous material, elastomers, plastic or the like, preferably treated to be fire resistant is interposed between the interlocking projections and recess structure. By profiling the interconnection to dove-tail, the structural elements can readily be connected together by sliding one against the other. It is also possible, however, to make the profiled element as rails, to be screwed to the structural elements to be connected together, one element to be snapped into the other.

The invention will be described by way of example with reference to the accompanying drawings, wherein:

FIG. 1 is a horizontal sectional view through a wall panel construction, in which the panels are secured to a stud;

FIG. 2 is a fragmentary horizontal sectional view through a door, and a door frame;

FIG. 3 is a fragmentary cross-sectional view illustrating longitudinal interconnection between a pair of support studs;

FIG. 4 is a side view of two walls, or two support studs with a cross connected connection element;

FIG. 5 is a cross-sectional view of an interconnecting arrangement in which the interengaging elements are formed as rails, screwed to the units to be connected;

FIG. 6 is a front view of the end portion of a profiled rail of FIG. 5;

FIG. 7 is a transverse cross-sectional view through an interconnecting arrangement in which one portion engages into the recess formed in the opposite wall structure;

and FIG. 8 is a transverse cross-sectional view through an interconnecting arrangement in which the structures to be connected have rails screwed thereon, and an interconnecting clip is provided connecting the two structures together.

In general, and with specific reference to FIG. 1, a pair of structural units 1, 2, shown in FIG. 1 as wall panels or wall plates, are to be interconnected together. An insulating mass 3 is located between the panels 1, 2, the mass 3 having fire resistant, heat and sound insulating properties. The wall construction is supported by studs, or cross members (as determined by structural requirements) 4, which separate the insulating mass into sections and which interconnect the two wall panels 1, 2. To prevent transmission of heat, fire, or sound from one wall side to the other, the cross section of the walls is interrupted by insulating layers 5, 6. Thus, the wall plates 1, 2, each rigidly connected with attachment elements 7, 8, respectively, are separated from each other by the central portion 9 of the stud, and are insulated from each other by insulating layers 5, 6.

The interconnection between the outer portions 7, 8 of the stud and the central portion 9 is not, as has been usual, with nails, or adhesive, but rather only by the shape of the profile of the elements themselves. Thus, parts 7, 8 form dove-tailed projections, part 9 having dove-tailed recesses, the outer parts 7, 8 of the stud being slid into the central part 9, the projections of the dove-tail fitting into the recessed, re-entrant portions 10, 11, of the recesses in stud 9. This type of interconnection totally avoids pins, pegs, nails, screws or the like, or an adhesive, and additionally avoids non-fire resistant interconnections of various types. Upon fire on one side of the wall construction, one of the wall panels 1, or 2, respectively, is first destroyed. The part 7, or 8, respectively, is somewhat more resistant and subject to destruction next, but further attack of fire is inhibited, or slowed by the presence of insulating mass 3, and by the insulating layers 5, 6. Insulating layers 5, 6 may include asbestos, asbestos fibers, or the like. Thus, the supporting function of the stud 9 is retained for a substantially longer period than if the insulating layer 5, 6 would not be present. Buckling of the backside of the wall, or stress on the studs already subject to attack by fire due to differential expansion of the wall panel with respect to the studs is avoided, so that the stud itself is less stressed at the time when its main bearing strength is most needed.

FIG. 2 illustrates an interconnection system for a door 13 in a door frame 14. This type of door construction is particularly suitable if sound insulation is required. Additionally, it is highly fire resistant and transmits much less sound to the wall if the door should slam.

FIG. 3 illustrates a pair of outer support elements 15, 16 interconnected by a central support element 21. Both elements 15, 16 are formed with dove-tailed re-entrant recesses 17, 18. If sound insulation, or heat insulation is not of primary importance, then it suffices if insulating layer 19, 20 is located only at the region of interlocking interengagement of the central support section 21 with recesses 17, 18, since this suffices in order to prevent direct contact of the outer studs 15, 16, with each other, and thus already provides a substantial degree of heat and sound insulation.

FIG. 4 illustrates an interconnection of a pair of walls, or studs, or other longitudinally placed elements 22, 23 by a horizontally running rail 24. The rail 24 is formed on both sides with dove-tailed projections, matching similarly shaped interlocking recesses in the walls, or studs or other elements 22, 23. The insulating layers 25, 26, following the profile of the dove-tailed recesses provide for good sound and thermal insulation of the elements 22, 23.

The layer of insulating material can be matched to the specific use, and the requirements of the application. Suitable material is asbestos, plastic material or felt. It may be in the form of a tape, ribbon, or a blanket or mat. To ease the introduction of the layer of insulating material, while permitting relative sliding movement of the dove-tailed projections into the recesses, slippery material or lubricant can be added, or applied together with one or the other of the matching interengaging elements. If the insulation material is in form of a tape or ribbon which is elastic, for example rubbery or the like, introduction can be substantially simplified if the tape or ribbon is stretched during insertion of the matching rail or structural element, in order to reduce the cross-sectional area of the ribbon during the insertion step. If a rubbery material is used, water is a simple lubricant. It is also possible to make the insulation layer in form of a flowable substance which is introduced in the gap between the projection and the recess; or to introduce the insulation material in form of a thick liquid, which can be brushed or rolled on the parts to be interconnected just before sliding them together. The material can later set, for example by chemical action, without, however, forming a bond or interconnection between the structural elements which are connected together only by the interlocked shape of the profiled recesses and projections.

FIG. 5 illustrates application of the present invention to interconnect a pair of wall panels, or the like, using separate rails screwed on the elements to be interconnected. Rail 27 is secured to a wall panel 30 by means of screws 31. The rail has a generally U-shaped cross-sectional profile, and is formed with a pair of internally projecting ribs 32, 33. These ribs define a chamber, or reception space having an opening towards the outside seen at 29. The opposite wall panel 34 has a profiled rail 28 secured thereto with screws 35. Rail 28 has a generally I-shaped cross section, one base 36 of the I being secured to panel 34, and formed with staggered holes to accept screws 35. A second transverse portion 37 of the I cross section is used to make the connection with the other rail, the web of the I 38 passing through the gap 39 in the chamber 29, formed by the two inwardly projecting ribs 32, 33 on rail 27. To interconnect the two units, one is inserted in the end of the other and the two are then slid together against each other.

The insulation material in the embodiment of FIG. 5 is formed by a rubbery elastic tape 40, which has a substantially semi-circular, U-shaped cross section with a groove 41 therein, the groove surrounding the smaller flange 37 of the I-shaped profile (see FIG. 5).

To interconnect the two panels 30, 34, and to facilitate insertion of the rails 27, 28, into each other, while placing the band-shaped insulation material 40, the end 41' of the smaller flange 37 of the profiled rail 38 is rounded (FIG. 6). The tape is then placed and guided in the direction of the dashed line, (see arrows 42, FIG. 6), and extended at its other ends, so that it will be pulled and stretched, reducing its cross-sectional area until the profiled rail 28, now provided with the stretched, thinned insulation band 40 can easily be inserted into the chamber 29 formed in profiled rail 27. After insertion and placement, tension is released on the elastic tape or ribbon 40, the tape or ribbon, or band will contract and will securely interconnect the two profiled rails together within the chamber 29. Thus, the two plates are securely interconnected, cannot be removed from each other, and yet can move with respect to each other and are connected only over an insulating material which is both a poor conductor of sound and heat.

Rail 27 is formed with projecting legs 43, 44 in order to increase the stiffness of the rail, and its resistance against bending, and thus to increase the stiffness and bearing strength of the wall panel unit.

FIGS. 7 and 8 illustrate interconnection of a pair of wall panels 46, 47 of a wall structure 45. An interconnecting unit 48 (FIG. 7) or 49 (FIG. 8) is longitudinally attached to one of the two plates, in the drawing to panel 46. The interconnection elements 48, 49 are in form of rails, and their connection to panel 46 can be accomplished in various ways. FIG. 7 illustrates interconnection by means of screws 50 which are carried transversely through an end portion 51 of interconnecting element 48, the end portion being bent transversely and flattened and formed with pre-drilled screw holes. FIG. 8 illustrates interconnection by means of an auxiliary profiled rail 52 which, in turn, is attached by means of screws 53 to panel 46. The connecting element 49 is inserted with its end 54 in rail 52, and locked therein. Both rail 52, as well as end 54 of connecting element 49 are dove-tailed in cross section. Additionally, the ends 55, 56 of element 54, which are bent inwardly toward each other, are spaced from each other so that they can be resiliently compressed, to be moved towards each other and then to be snapped into the dove-tailed rail 52, behind the inwardly bent projections 58 thereof, ends 55, 56, resiliently again reverting to their original position to be securely attached to the wall. To additionally improve the interconnection, a wedging or spacer element 59 can be inserted at the terminal end between the end portions 55, 56 to press them outwardly and securely seat them in the interlocking dove-tailed matching rail 52. The position of the legs 60, 61 having the ends 55, 56 when they are compressed is indicated by the dashed lines 62, 63 in FIG. 8.

The rails 52, 48, 49 need not extend throughout the entire length of the wall plates; they may be made as sectional interconnection elements. After one or more interconnecting element is secured to one of the plates 46, the oppositely located profiled end 64, 65 respectively of the other plate 47 can be secured. Plate 47, to this end, has a matching interlocking dove-tailed reception space 66, 67 located thereon, with which the projecting portion is to be interlocked. In accordance with FIG. 7, the reception space 66 is formed as a groove machined or cut into plate 47. In accordance with FIG. 8, a profiled rail is provided, the end 65 of the interconnecting elements being secured in the same manner as the already connected end 54 to plate 46, so that the interconnecting element 49 may have a plane of symmetry which is parallel to the surfaces of the wall panels 46, 47.

The interconnecting element 48 of FIG. 7 has a generally V-shaped cross section. At the apex, a flange 67 is formed, drilled with holes 68 to receive screws 50. The V-shaped divergent legs 69, 70 have ends 71, 72 which are bent over inwardly, so that they face each other. The bent-over ends 71, 72 together define with a portion of the legs 69, 70 a space or channel 73 into which one or more spacer elements 74, preferably shaped to fit and lock with the expanded V-shaped legs, can be inserted, in order to press the legs 69, 70 outwardly and to securely lock them in the space 66 of plate 47. In order to prevent transmission of sound or heat from plate 46 to plate 47 over the interconnecting elements 48, 49, and in order to further improve the fire resistance of the entire wall panel element 45, particularly if an insulating mass is located between plates 46, 47, an insulating layer 75, 76 can be located on at least one of the plates 46, 47. This inhibiting direct contact between the ends of the legs 55, 56, and 71, 72, respectively, with the inner walls of the reception space or chamber. This insulating layer can be applied, for example, before the interconnecting elements are snapped or connected together. This embodiment of the invention is particularly useful with foil-shaped insulating material since, otherwise, it would be difficult to slide the elements longitudinally with respect to each other, with a layer of insulation material previously inserted. The insulation layer 75, 76 may have a general U-shaped cross section, formed as a longitudinal profiled band or ribbon, and pressed into the space 57, 66.

The material to be used may be elastic, the resilient legs 77, 78 yieldingly engaging the inclined side surfaces 79, 80 of the reception space or groove 66. Any suitable generally used insulation material can be used for layers 75, 76, such as asbestos, fibrous material, asbestos fibers, plastic, glass fibers, impregnated tapes and materials using glass and plastics and the like. The spacer elements 59, 74 may be in the form of separate pieces sequentially inserted into the channel formed by the interconnection element, or in the space formed at least by one of the ends of the interconnection elements. They can be inserted manually or by a suitable pusher insertion tool.

Various different shapes and profiles are possible besides those illustrated in the Figures and particularly in FIGS. 7 and 8, it being only necessary that the interconnecting element interlocks, and is so shaped that one, or both ends of the interconnecting element engage and interlock with a reception recess or space which is connected, or part of the other part to be interconnected together. For example, space 66 of FIG. 7 can be formed as a separate unit, for example a rail, secured to wall 47. The cross section need not be dove-tailed, but can be similar to the space 29 (FIG.5), the matching projecting element having squared terminal portions which can be resiliently compressed.

To interconnect plate 47 with a plate 46 on which the interconnecting elements 48, 49 are already attached, the legs 60, 61 or 69, 70 must be brought in the position indicated by the dashed line 62, 63 and 81, 82, or they must be brought into this position during insertion, in order to pass the narrowest point of the reception recess. After insertion, they will again snap resiliently outwardly and interengage the reentrant inner wall of the reception zone; for secure attachment, the spacer elements 59, 74 can additionally be used to press the legs outwardly against side walls 79, 80. In the form of the invention in which the projecting element is first attached to one wall portion, then to be snapped into the recess rail, or groove, it usually suffices to press the ends of the legs together sufficiently so that they can be inserted into the reception recess. Upon then pressing the plates 46, 47 together, the remaining portion of the interconnecting elements is cammed by the edge inwardly towards the reception zone and thus the entire rail sections are snapped together.

The interconnection structure and system of the present invention provides for reliable interconnection of the parts of a structural unit, so that bulging and buckling due to differential expansion is essentially avoided. The arrangement permits application to existing elements and panels, by use of rails, and permits essentially free expansion of parts 46, 47 with respect to each other. Additionally, a transversely directed expansion is permitted if at least one of the transverse ends of the interconnection, as seen in FIGS. 7 and 8, has insulation material embedded therein, or if the interconnecting element itself permits lateral resilient deformation. The structural portions interconnected by the system are securely held, so that the construction is stable. If separate rails are used, steel channels, drawn aluminum profiled elements, and plastic rails, or connecting units are suitable.

The interconnection system is particularly suitable in which the parts have differential expansion in one primary direction, parallel with respect to each other, for example upon interconnection between wood, plastic, stone, or metal, for example when making panelled or trussed structural units.

Various changes and modifications may be made within the inventive concept.

I claim:

1. Interconnection system to interconnect one elongated structural element (30) to another elongated structural element (34) to be located parallel thereto, comprising a pair of separable profiled interlocking rails adapted for connection to one, and the other structural element, respectively, one of the rails (27) being formed with a chamber (29) having an opening (39) formed therein and directed towards the other rail, the other rail being formed with a projection which, in cross section, has a T-shaped end portion (28), the cross member thereof fitting within the chamber (29) and the web (38) thereof passing through the opening in the chamber at least one end (41) of the T-shaped rail (28) being rounded;

and a layer of elastomer ribbon (40) which is longitudinally stretchable and fitted around the ends of the cross member of the T-shaped end portion (28) along the length of the rail interposed between the interlocked rails to permit application of tension to stretch the elastomer ribbon longitudinally, and thus reduce its thickness, during sliding of said rails relative to each other during assembly of the rails together, while providing for locked engagement of the cross member of the T-shaped end portion in the chamber of the other rail upon release of stretching tension, the elastomer ribbon (40) being carried around the rounded end.

2. System according to claim 1, wherein the elastomer ribbon (40) is formed with a groove (41) therein, shaped to fit around the cross member of the T-shaped end portion (28).

3. System according to claim 1, wherein one of the profiled rails (27) comprises a generally channel-shaped rail having spaced, facing ribs (32, 33) extending inwardly from the legs of the channel and defining the chamber between the ribs and the base of the channel, the legs (43, 44) of the channel projecting beyond the junction with the ribs for spacing and locating the other (28) of the rails;

and the generally T-shaped rail is dimensioned that the cross member (37) of the T is located about centrally within the chamber and spaced from the other wall by said ribbon of elastomer material, the web (38) of the T passing between the space of the facing, projecting ribs (32, 33).

* * * * *